United States Patent [19]

Magnarelli et al.

[11] 4,430,928
[45] Feb. 14, 1984

[54] PISTON ASSEMBLY AND A METHOD FOR MANUFACTURING PISTON ASSEMBLIES

[75] Inventors: John Magnarelli, Liverpool; Matthew Rybinski, Minoa, both of N.Y.

[73] Assignee: Carrier Corporation, Syracuse, N.Y.

[21] Appl. No.: 289,633

[22] Filed: Aug. 3, 1981

[51] Int. Cl.³ .............................. F16J 1/14; F16C 9/04
[52] U.S. Cl. ...................................... 92/187; 92/256; 92/128
[58] Field of Search ................ 92/187, 255, 256, 59, 92/128; 403/154, 155; 29/156.5 A, 156.5 R

[56] References Cited

U.S. PATENT DOCUMENTS

| | | |
|---|---|---|
| 1,482,868 | 2/1924 | Richard . |
| 1,524,702 | 2/1923 | Fleischer . |
| 1,643,720 | 9/1927 | McKone ............................... 92/187 |
| 2,422,327 | 6/1947 | Winslow .............................. 403/154 |
| 2,487,813 | 8/1947 | Heimann . |
| 2,747,696 | 5/1956 | Blattner .............................. 403/154 |
| 2,755,114 | 7/1956 | Becker . |
| 2,860,016 | 11/1958 | Swart .................................. 403/155 |
| 2,913,292 | 8/1958 | Rogers . |
| 4,050,360 | 9/1977 | Powers et al. . |

FOREIGN PATENT DOCUMENTS

| | | |
|---|---|---|
| 162768 | 2/1920 | United Kingdom ................ 403/154 |
| 680416 | 10/1952 | United Kingdom ................ 403/154 |

Primary Examiner—Robert E. Garrett
Assistant Examiner—Richard L. Klein
Attorney, Agent, or Firm—David J. Zobkiw

[57] ABSTRACT

A piston assembly and a method for manufacturing piston assemblies. The piston assembly comprises a piston body, a connecting rod, a wrist pin, and a retaining spring holding the wrist pin within the piston body and maintaining the connecting rod spaced from a sidewall of the piston body. The retaining spring includes a central member, first and second side members, and resilient tab means. The central member is located between the wrist pin and a head of the piston body. The first and second side members extend rearward from opposed sides of the central member, between the connecting rod and the sidewall of the piston body, maintaining the connecting rod spaced therefrom, and define aligned spring openings receiving the wrist pin. The resilient tab means extends forward from the central member, engages the head of the piston body, and urges the first and second side members into pressure contact with the wrist pin to maintain the wrist pin within the piston bore.

12 Claims, 9 Drawing Figures

PISTON ASSEMBLY AND A METHOD FOR MANUFACTURING PISTON ASSEMBLIES

BACKGROUND OF THE INVENTION

This invention generally relates to piston assemblies and to methods for manufacturing piston assemblies.

Piston assemblies are widely used in a variety of machines and other devices. One common use, for instance, is in a reciprocating compressor, employed as part of a refrigeration system, to compress a refrigerant vapor. Typically, a piston assembly includes a piston body, a connecting rod, and a wrist pin. The body defines a longitudinally extending recess, which is closed at a forward or head end, and a transverse piston bore, which intersects the longitudinal recess. A first end of the connecting rod extends into the longitudinal recess and defines a rod bore aligned with the transverse piston bore.

The wrist pin extends within this transverse piston bore and is supported by the piston body. The wrist pin also extends through the rod bore, joining the connecting rod to the piston body while allowing the connecting rod to pivot relative thereto. The connecting rod longitudinally extends from the wrist pin and, when assembled within a machine, a second or crankshaft end of the connecting rod is connected to an eccentric or off center portion of a rotatable crankshaft. Rotation of the crankshaft both pivots the connecting rod about the axis of the wrist pin and reciprocates the entire piston assembly. This reciprocating movement of the piston assembly may then be employed, as an example, to compress a vapor.

In these piston assemblies, it is usually preferred to secure the wrist pin within the piston bore defined by the piston body to prevent the wrist pin from inadvertently slipping out of the piston bore. Also, it is commonly preferred to maintain the connecting rod spaced from the sidewall of the piston body and to inhibit the connecting rod from sliding along the axis of the wrist pin. Maintaining the connecting rod spaced from the piston body sidewall prevents frictional wear between the connecting rod and the sidewall, increasing the effective life span of the connecting rod, the piston body, and thus the entire piston assembly. Preventing the connecting rod from sliding along the axis of the wrist pin inhibits cocking or bending of the connecting rod, further increasing the useful work life thereof.

For these reasons, piston assemblies are often provided with various clips, springs, or other similar members to hold the wrist pin within the piston bore and to maintain the forward end of the connecting rod centrally located along the axis of the wrist pin, spaced from the sidewall of the piston body. For example, the surfaces of the piston body that define the piston bore may also define a pair of spaced annular grooves extending around the piston bore, outward of the wrist pin. Snap rings may be fitted into these grooves and extend into the piston bore, axially outside the wrist pin to maintain wrist pin within the piston bore. In addition, spacing members may be disposed between the connecting rod and the piston sidewall, preventing the connecting rod from moving along the axis of the wrist pin and preventing contact between the connecting rod and the piston sidewall.

While these prior art retaining arrangements generally operate very effectively, they typically comprise a plurality of separate pieces or elements, and during the manufacture of the piston assembly, a separate step must be taken to place each individual piece within the piston assembly. Any reduction in the number of steps required to manufacture the piston assembly is, of course, highly desirable since it decreases the cost of the piston assembly and increases the productivity of the workers who manufacture these assemblies.

A SUMMARY OF THE INVENTION

In view of the above, an object of the present invention is to improve piston assemblies and methods for manufacturing piston assemblies.

Another object of this invention is to use a single, integral retaining spring to hold a wrist pin within a piston assembly and to maintain a connecting rod of the assembly spaced from an adjacent sidewall of the piston assembly.

A further object of the present invention is to employ a head of a piston body of a piston assembly to urge a resilient member into pressure engagement with a wrist pin to hold the wrist pin in the piston assembly.

These and other objectives are attained with a piston assembly comprising a piston body, a connecting rod, a wrist pin, and a retaining spring. The piston body includes a head extending across a forward end of the body and a sidewall extending rearward from the head, and the piston body defines a longitudinal recess and a transverse piston bore intersecting the longitudinal recess. The connecting rod extends within the longitudinal recess and defines a rod bore aligned with the piston bore. The wrist pin is supported within the piston bore, extends through the rod bore, and supports the connecting rod for pivotal movement relative to the piston body. The retaining spring is positioned within the longitudinal recess, holds the wrist pin within the piston bore, and maintains the connecting rod spaced from the sidewall of the piston body.

More specifically, the retaining spring includes a central member, first and second side members, and resilient tab means. The central member is located between the wrist pin and the head of the piston body. The first and second side members extend rearward from opposed sides of the central member, between the connecting rod and the sidewall of the piston body, maintaining the connecting rod spaced therefrom, and the first and second side members define aligned spring openings receiving the wrist pin. The resilient tab means extends forward from the central member, engages the head of the piston body, and urges the first and second side members into pressure contact with the wrist pin to maintain the wrist pin within the piston bore.

A BRIEF DESCRIPTION OF THE DRAWINGS

A DETAILED DESCRIPTION OF THE PREFERRED EMBODIMENT

In discussing the various Figures, like numerals will be used to refer to identical or corresponding elements.

Figure 1:
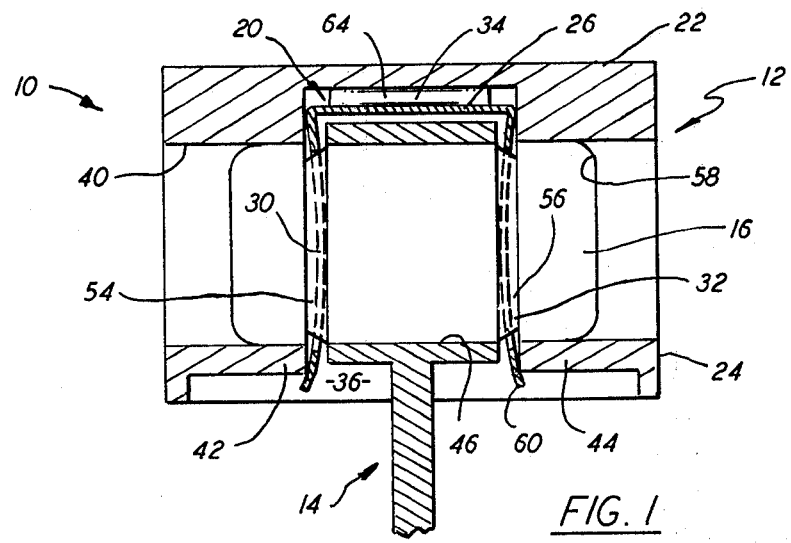
FIG. 1 is an enlarged side view, partially in cross section, of a piston assembly illustrating teachings of the present invention.
Figure 2:
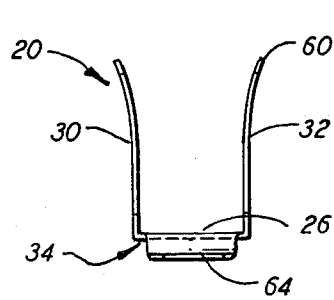
FIGS. 2, 3, 4 and 5 are enlarged front, top, side and layout views respectively of the retainer spring of the piston assembly shown in FIG. 1.
Figure 4:
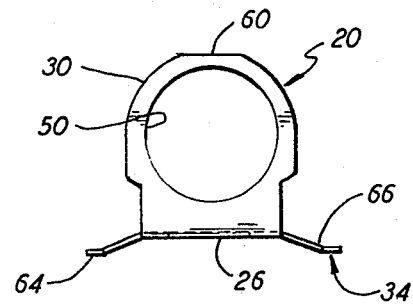
Figure 3:
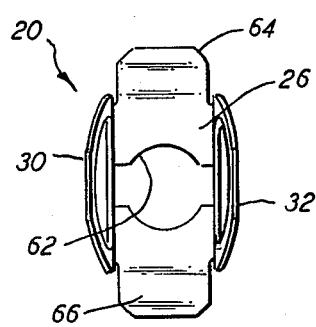
Figure 5:
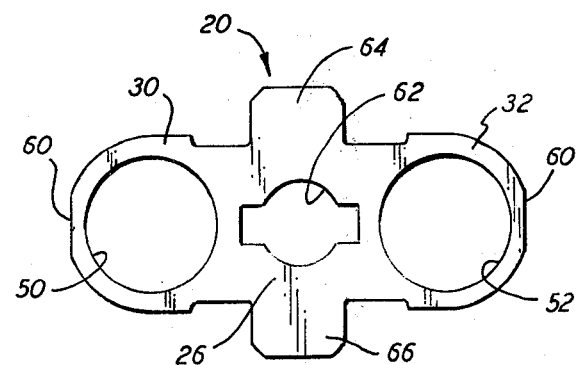
Figure 6:
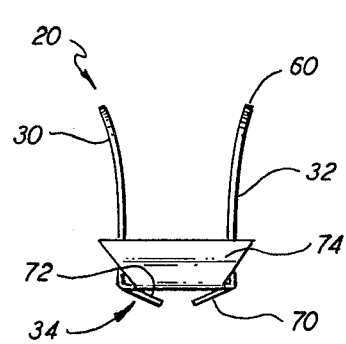
FIGS. 6, 7, 8, and 9 are enlarged front, top, side and layout views respectively of an alternate retainer spring suitable for use in the piston assembly shown in FIG. 1.
Figure 8:
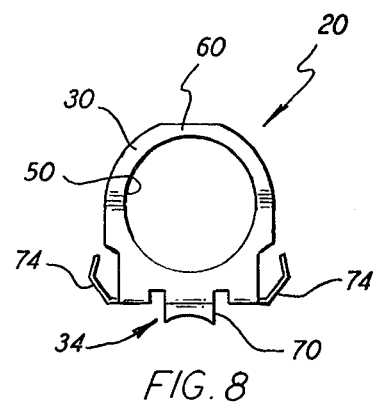
Figure 7:
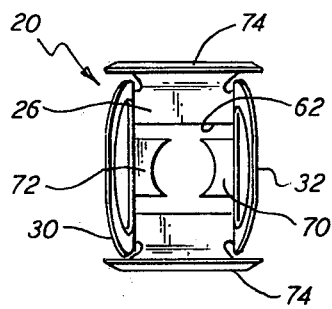
Figure 9:
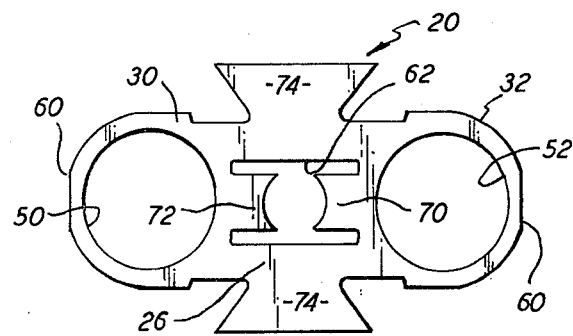

Particularly referring to FIG. 1, piston assembly 10 comprises piston body 12, connecting rod 14, wrist pin 16, and retaining spring 20. Body 12 includes head 22 and sidewall 24; and spring 20 includes central member 26, first and second side members 30 and 32, and resilient tab means 34. Body head 22 extends across a front or forward end of piston body 12, and sidewall 24 extends rearward from the body head. Piston body 12 defines longitudinal recess 36 and transverse piston bore 40 intersecting recess 36; and preferably body sidewall 24 includes a pair of opposed, inwardly projecting, oval shaped bosses 42 and 44 which define the transverse piston bore. Connecting rod 14, specifically a forward end thereof, extends within longitudinal recess 36 and defines rod bore 46 aligned with piston bore 40. Wrist pin 16 is supported within piston bore 40, extends through rod bore 46, and supports connecting rod 14 for pivotal movement relative to piston body 12. Retaining spring 20 is positioned within longitudinal recess 36, holds wrist pin 16 within piston bore 40, and maintains connecting rod 14 spaced from sidewall 24 of piston body 12. As will be apparent to those skilled in the art, when assembled within a machine, a second end of connecting rod 14 is connected to a rotatable crankshaft, wherein rotation of the crankshaft either causes or is caused by reciprocating movement of piston body 12 within a piston chamber.

Discussing spring 20 in greater detail, central member 26 is located between wrist pin 16 and head 22 of piston body 12. First and second side members 30 and 32 extend rearward from opposed sides of central member 26, between connecting rod 14 and sidewall 24 of piston body 12, maintaining the connecting rod spaced therefrom. Also, first and second side members 30 and 32 define aligned spring openings 50 and 52 receiving wrist pin 16. Resilient tab means 34 extends forward from central member 26, engages head 22 of piston body 12, and urges side members 30 and 32 into pressure contact with wrist pin 16 to maintain the wrist pin within piston bore 40.

Preferably, wrist pin 16 defines a pair of spaced, annular grooves 54 and 56 which, in assembly, are located between piston sidewall 24 and connecting rod 14, and surfaces of retaining spring side members 30 and 32 defining spring openings 50 and 52 extend into annular grooves 54 and 56, positively securing the wrist pin within piston assembly 10. With the preferred embodiment of wrist pin 16 illustrated in FIG. 1, annular grooves 54 and 56 include inclined bottom surfaces, sloping upward toward the central, outside surface of the wrist pin, and the wrist pin defines rounded or tapered axial ends 58. These inclined surfaces of grooves 54 and 56 and the tapered axial ends 58 of wrist pin 14 facilitate manufacturing piston assembly 10, as explained in greater detail below. Alternately, it should be noted, annular grooves 54 and 56 may include comparatively flat bottom surfaces, and wrist pin 16 may define relatively flat axial ends.

Returning to retaining spring 20, spring openings 50 and 52 preferably have a circular shape, with surfaces of side members 30 and 32 extending completely around the circumference of the side openings. In addition, to facilitate pushing spring 20 toward piston head 22 via rear edges of side members 30 and 32, preferably the side members define relatively flat rearward edges 60 and these edges project slightly rearward of the adjacent surfaces of piston sidewall 24. Preferably, side members 30 and 32 of retaining spring 20 are arched or curved slightly, bending between adjacent surfaces of connecting rod 14 and sidewall 24 of piston body 12. With this arched arrangement, side members 30 and 32 not only maintain connecting rod 14 spaced from sidewall 24, but also urge the connecting rod to a stable, central position along the axis of wrist pin 16. This inhibits connecting rod 14 from moving along the axis of wrist pin 16, restricting the connecting rod from cocking or bending along its own longitudinal axis during operation of piston assembly 10.

Also, preferably central member 26 of retaining spring 20 defines central, forward opening 62 to provide additional clearance between the central member and connecting rod 14. With central opening 62, the forwardmost portion of connecting rod 14 may project above central member 26, through central opening 62, without the central member striking, rubbing, or otherwise interfering with movement of the connecting rod during normal operation of piston assembly 10. While the advantages of opening 62 are not utilized with piston assembly 10 shown in FIG. 1, central opening 62 allows retaining spring 20 to be used with piston assemblies having a much smaller clearance or space between the forwardmost surface of connecting rod 14 and the adjacent surface of piston body head 22.

With the preferred embodiment of retaining spring 20 illustrated in FIGS. 1 through 5, resilient tab means 34 includes a pair of spaced tabs 64 and 66 which, in assembly, extend forward and outward from opposed outside edges of central member 26. Preferably, tabs 64 and 66 also lightly engage or extend adjacent to opposite portions of the inside surface of piston body sidewall 24, between bosses 40 and 42, to maintain retaining spring 20 in a predetermined position relative to—preferably centered between—these opposite surfaces of the piston body sidewall during manufacture of piston assembly 10.

The embodiment of retaining spring 20 shown in FIGS. 6 through 9 is very similar to the retaining spring described above and illustrated in FIGS. 1 through 5, including central member 26, side members 30 and 32, resilient tab means 34, spring openings 50 and 52, flat rearward edges 60, and central opening 62. With the retaining spring 20 shown in FIGS. 6 through 9, however, resilient tab means 34 includes a pair of spaced tabs 70 and 72 extending forward and inward from opposed edges of central member 26 defining central opening 62. Also, this embodiment of retainer spring 20 preferably includes centering tabs 74 which, in assembly, extend adjacent to or may lightly engage opposite, outside, forward or upper surfaces of each of the bosses 42 and 44 to maintain the retaining spring in a centered position within piston body 12 during the manufacture of piston assembly 10.

As will be apparent to those skilled in the art, the retaining springs described above may be formed from any suitable flexible material, such as a thin gauge, resilient steel. The springs may be stamped from a flat sheet of material, in the pattern shown in FIGS. 5 and 9, and then bent or formed into the shapes illustrated in FIGS. 1 through 4 and 6 through 8.

To manufacture piston assembly 10, retaining spring 20 is placed inside piston body 12, between bosses 42 and 44, and with resilient tab means 34 engaging piston head 22. It should be noted that retaining spring 20 is substantially prevented from moving sideways within recess 20, both along and transverse to the axis of piston bore 40. Sideways movement of retaining spring 20 transverse to the axis of piston bore 40 is inhibited either, in the case of the embodiment of the retainer spring shown in FIGS. 1 through 5, by engagement between tabs 64 and 66 and opposed surfaces of piston body sidewall 24, or in the case of the embodiment of retaining spring 20 shown in FIGS. 6 through 9, by engagement between centering tabs 74 and opposite, upper surfaces of each of the bosses 42 and 44. Movement of retaining spring 20 along the axis of piston bore 40 is substantially prevented by abutting engagement between side members 30 and 32 and bosses 42 and 44.

The forward end of connecting rod 14 is placed within piston body 12, between side members 30 and 32 of retaining spring 20, and rod bore 46 is aligned with piston bore 40. Next, wrist pin 16 is inserted into piston bore 40, through spring openings 50 and 52, and through rod bore 46. At the same time, resilient tab means 34 is pushed forward against head 22 of piston body 12 wherein, when wrist pin 16 reaches an assembled position, resilient tab means 34 urges the retaining spring rearward in pressure contact with the wrist pin to maintain the wrist pin within piston bore 40. Preferably, as will be apparent, wrist pin 16 is positioned with annular grooves 54 and 56 aligned with forward edges of the surfaces of side members 30 and 32 defining spring openings 50 and 52; and when the wrist pin is so positioned, tab means 34 urges these edges of the side members 30 and 32 into annular grooves 54 and 56, positively locking wrist pin 16 in place.

With the preferred embodiment of wrist pin 16 described above, the wrist pin itself pushes resilient tab means 34 toward piston head 22 as the wrist pin is inserted into piston bore 40. More particularly, as wrist pin 16 is inserted into piston bore 40, a rounded end 58 of the wrist pin contacts the surfaces of a first side member, for example side member 30, of retainer spring 20 defining a first spring opening, for example opening 50. As wrist pin 16 is further inserted into piston bore 40, the surfaces of rounded end 58 force retainer spring 20 forward, toward piston head 22. With this procedure, of course, as a first annular groove, for example groove 56, slides past the first side member 30, tab means 34 urges surfaces of that side member into the first annular groove. With annular grooves 54 and 56 having inclined bottom surfaces, though, as wrist pin 16 continues to move into piston bore 40, the bottom surface of the first annular groove simply repushes the first side member of spring 20 out of the first annular groove, allowing the wrist pin to continue easily sliding past the first side member and into the preferred assembled position shown in FIG. 1.

Other steps, as will be understood, may be employed to push retaining spring 20 forward, toward piston head 22. For instance, and particularly if annular grooves 54 and 56 of wrist pin 16 include relatively flat bottom surfaces, a tool may be pushed against flat rear edges 60 of retaining spring side members 30 and 32 to force the retaining spring 20 forward. If this pushing step is used, then, once wrist pin 16 is properly positioned within piston assembly 10, the pushing step is terminated, wherein resilient tab means 34 urges the resilient spring 20 into pressure contact with the wrist pin.

If the latter type of pushing step is employed, and again particularly if annular grooves 54 and 56 of wrist pin 16 include relatively flat bottom surfaces, the process of manufacturing piston assembly 10 may be facilitated somewhat by pushing the side members of retaining spring 20 forward one at a time toward piston body head 22, and inserting wrist pin 16 through a spring opening while the side member defining that opening is being pushed toward head 22. That is, pushing a first side member forward, inserting wrist pin 16 through the spring opening defined by that first side member while pushing the side member forward; and then pushing a second side member forward, and inserting the wrist pin through the spring opening defined by that second side member while pushing the second side member forward.

As will be apparent from the above remarks, to disassemble piston assembly 10, retainer spring 20 is pushed forward, toward piston head 22 to relieve the pressure between the retainer spring and wrist pin 16. Preferably, this is done by pushing a tool forward against rear edges 60 of retainer spring 20. With the pressure relieved between wrist pin 16 and retainer spring 20, the wrist pin is pushed out of piston bore 46, and then connecting rod 14 and the retainer spring may be simply pulled out of longitudinal recess 36.

Thus, as will be appreciated from a brief review of the above discussion, the present invention effectively employs a single retaining spring, with its concomitant ease of assembly, simultaneously to hold the wrist pin within the piston assembly, to maintain the connecting rod spaced from the adjacent sidewall of the piston assembly, and to center the connecting rod within the piston assembly. The retaining spring operates very effectively, is itself very simple to manufacture, and is generally less expensive to manufacture in comparison to the total cost of manufacturing the plural, separate retaining pieces commonly used with prior art piston assemblies.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A piston assembly comprising:
   a piston body including a head extending across a forward end of the body and a sidewall extending rearward from the head, and defining a longitudinal recess and a transverse piston bore intersecting the longitudinal recess;
   a connecting rod extending within the longitudinal recess, and defining a rod bore aligned with the piston bore;
   a wrist pin supported within the piston bore, extending through the rod bore, and supporting the connecting rod for pivotal movement relative to the piston body; and
   a retaining spring positioned within the longitudinal recess, holding the wrist pin within the piston bore, and maintaining the connecting rod spaced from the sidewall of the piston body, and including
   a central member located between the wrist pin and the head of the piston body,
   first and second side members extending rearward from opposed sides of the central member, between the connecting rod and the sidewall of the piston body, maintaining the connecting rod spaced therefrom, and defining aligned spring openings receiving the wrist pin, and resilient tab means extending forward from the central member, engaging the head of the piston body, and urging the first and second side members into pressure contact with the wrist pin to maintain the wrist pin within the piston bore.

2. A piston assembly as defined by claim 1 wherein:
the wrist pin defines a pair of spaced, annular grooves; and
surfaces of the first and second side members defining the spring openings extend into the annular grooves defined by the wrist pin.

3. A piston assembly as defined by claim 2 wherein:
the wrist pin defines inclined surfaces at the bottom of the annular grooves; and
the wrist pin defines rounded axial ends.

4. A piston assembly as defined by claim 3 wherein the central member defines a central opening to provide additional clearance between the connecting rod and the central member.

5. A piston assembly as defined by claim 4 wherein the tab means includes a pair of spaced tabs extending forward and outward from opposed, outside edges of the central member.

6. A piston assembly as defined by claim 4 wherein the tab means includes a pair of spaced tabs extending forward and inward from opposed edges of the central member defining the central opening.

7. A piston assembly as defined by claims 5 or 6 wherein the first and second side members define flat rearward edges to facilitate pushing the retaining spring toward the head of the piston body.

8. A method for manufacturing a piston assembly including a body having a head and defining a longitudinal recess and a transverse piston bore intersecting the longitudinal recess, a connecting rod having a forward end defining a rod bore, and a retaining spring having resilient tab means and a pair of spaced, side members projecting rearward of the tab means and defining a pair of spring openings, the method comprising the steps of:
placing the retaining spring inside the piston body;
engaging the head of the piston body with the resilient tab means;
placing the forward end of the connecting rod between the side members of the retaining spring;
aligning the rod bore with the piston bore;
inserting the wrist pin into the piston bore, through the spring openings, and through the rod bore; and
pushing the resilient tab means forward against the head of the piston body; and
urging the retaining spring rearward in pressure contact with the wrist pin to maintain the wrist pin within the piston bore.

9. A method as defined by claim 8 wherein the pushing step includes the steps of:
engaging the side members of the retaining spring with the wrist pin; and
forcing the retaining spring forward as the wrist pin is inserted into the piston bore.

10. A method as defined by claim 9 wherein the wrist pin defines a pair of spaced, annular grooves, and wherein:
the inserting step includes the step of aligning the wrist pin grooves with surfaces of the side members of the retaining spring defining the spring openings; and
the urging step includes the step of urging surfaces of the side members defining the spring openings into the annular grooves defined by the wrist pin.

11. A method as defined by claim 8 wherein the urging step includes the step of terminating the pushing step, wherein the resilient tab means urges the retaining spring into pressure contact with the wrist pin.

12. A method as defined by claim 11 wherein:
the pushing step includes the steps of
pushing a first side member forward, and
later pushing a second side member forward; and
the inserting step includes the steps of
inserting the wrist pin through a spring opening defined by the first side member while pushing the first side member forward, and
inserting the wrist pin through a spring opening defined by the second side member while pushing the second side member forward.

* * * * *